United States Patent
Lukic

(10) Patent No.: US 10,942,068 B2
(45) Date of Patent: *Mar. 9, 2021

(54) METHOD FOR MEASURING AN OPERATING TEMPERATURE OF EQUIPMENT

(71) Applicant: Hilti Aktiengesellschaft, Schaan (LI)

(72) Inventor: Sasha Lukic, Buchs (CH)

(73) Assignee: Hilti Aktiengesellschaft, Schaan (LI)

( * ) Notice: Subject to any disclaimer, the term of this patent is extended or adjusted under 35 U.S.C. 154(b) by 132 days.

This patent is subject to a terminal disclaimer.

(21) Appl. No.: 15/778,570

(22) PCT Filed: Nov. 23, 2016

(86) PCT No.: PCT/EP2016/078486
§ 371 (c)(1),
(2) Date: May 23, 2018

(87) PCT Pub. No.: WO2017/093086
PCT Pub. Date: Jun. 8, 2017

(65) Prior Publication Data
US 2018/0335349 A1 Nov. 22, 2018

(30) Foreign Application Priority Data
Nov. 30, 2015 (EP) .................................... 15197021

(51) Int. Cl.
*G01K 1/08* (2006.01)
*G01K 5/28* (2006.01)
(Continued)

(52) U.S. Cl.
CPC ................ *G01K 5/28* (2013.01); *G01C 9/26* (2013.01); *G01C 15/004* (2013.01);
(Continued)

(58) Field of Classification Search
None
See application file for complete search history.

(56) References Cited

U.S. PATENT DOCUMENTS 6,621,560 B2 * 9/2003 Greco ................. G01B 21/045
33/366.11
8,269,984 B2 * 9/2012 Hinderling ........... G01C 15/004
356/614

(Continued)

FOREIGN PATENT DOCUMENTS

| DE | 10 2013 217 479 A1 | 3/2015 |
| EP | 0 130 738 A2 | 1/1985 |
| EP | 2 053 353 A1 | 4/2009 |

OTHER PUBLICATIONS

PCT/EP2016/078486, International Search Report (PCT/ISA/220 and PCT/ISA/210) dated Feb. 14, 2017, with partial English translation, enclosing Written Opinion of the International Searching Authority (PCT/ISA/237) (Twelve (12) pages).

(Continued)

*Primary Examiner* — Lisa M Caputo
*Assistant Examiner* — Nasir U. Ahmed
(74) *Attorney, Agent, or Firm* — Crowell & Moring LLP

(57) ABSTRACT

A method for measuring an operating temperature of equipment which can be oriented in a defined state using a leveling instrument, where the leveling instrument includes at least one tilt sensor with a housing that is filled with a liquid and a gas bubble, a light source, and a photosensor. The method includes storing a characteristic curve of bubble lengths for the gas bubble and temperatures in a control device of the equipment, measuring the bubble length of the gas bubble, and determining the temperature associated with the measured bubble length of the gas bubble with the aid of the characteristic curve.

4 Claims, 3 Drawing Sheets

(51) Int. Cl.
*G01C 9/26* (2006.01)
*G01C 15/00* (2006.01)
*G01K 15/00* (2006.01)

(52) U.S. Cl.
CPC ......... G01C 15/008 (2013.01); G01K 15/005 (2013.01); *G01K 2217/00* (2013.01)

(56) References Cited

U.S. PATENT DOCUMENTS

2007/0044331 A1* 3/2007 Yung .................... G01C 15/004
33/286
2010/0125245 A1* 5/2010 Geipel .................. A61M 5/141
604/111

OTHER PUBLICATIONS

U.S. Patent Application, "Method for Orienting a Device Axis in a Defined State", filed May 23, 2018, Inventor: Sasha Lukic.
U.S. Patent Application, "Method for Checking and/or Calibrating a Horizontal Axis of a Rotating Laser", filed May 23, 2018, Inventor: Sasha Lukic et al.
U.S. Patent Application, "Method for Measuring a Measurement Distance Between a Rotating Laser and a Laser Receiver", filed May 23, 2018, Inventor: Andreas Winter et al.
U.S. Patent Application, "Method for Checking a Rotary Laser Level for Cone Errors", filed May 23, 2018, Inventor: Sasha Lukic.
U.S. Patent Application, "Method for Checking and/or Calibrating a Vertical Axis of a Rotating Laser", filed May 23, 2018, Inventor: Sasha Lukic et al.

* cited by examiner

METHOD FOR MEASURING AN OPERATING TEMPERATURE OF EQUIPMENT

CROSS REFERENCE TO RELATED APPLICATIONS

This application claims the priority of International Application No. PCT/EP2016/078486, filed Nov. 23, 2016 and European Patent Document No. 15197021.7, filed Nov. 30, 2015, the disclosures of which are expressly incorporated by reference herein.

BACKGROUND AND SUMMARY OF THE INVENTION

The present invention relates to a method for measuring an operating temperature of equipment, which can be oriented in a defined state using a leveling instrument, as well as a piece of equipment.

The accuracy of equipment like rotating lasers is affected by environmental conditions such as the storage temperature or the operating temperature of the equipment, by the effects of an external force on the equipment in the event of falls or strong impacts and by aging processes of the instrument components of the equipment. The aging of instrument components takes place over a long period of time and changes the accuracy of equipment very slowly. The effect of an external force on equipment from a fall or a strong impact is an event, which the operator cannot foresee and therefore is difficult to take into consideration. In contrast to this, the operating temperature of equipment is a variable, which always has an impact on the accuracy of the equipment. Every time the equipment is used or operated, environmental conditions are in effect that have an impact on the accuracy of the equipment.

Rotating lasers can be disposed in different device positions, which are configured as the horizontal position and the vertical position. In doing so, a differentiation is made between horizontally usable rotating lasers, which are used solely in the horizontal position, and horizontally and vertically usable rotating lasers, which are used in the horizontal and vertical positions. Horizontally usable rotating lasers have, as device axes, a first horizontal axis and a second horizontal axis, which run perpendicularly to each other and span a horizontal plane. Along with the first and second horizontal axes, horizontally and vertically usable rotating lasers have, as a device axis, a vertical axis, which runs perpendicularly to the horizontal plane of the first and second horizontal axes.

In their operating instructions for the operating temperature of the rotating laser, device manufacturers of rotating lasers define a temperature range in which the rotating laser may be operated. The operation of rotating lasers is typically permissible in a temperature range of −20° C. to +50° C. The device manufacturer performs the adjustment of a rotating laser and the calibration of the device axes under defined environmental conditions; the device axes are typically calibrated at a normal temperature of +20° C. In order to guarantee the accuracy of a rotating laser during operation, the operator must regularly check accuracy and if a maximum difference defined by the device manufacturer is exceeded, the rotating laser must be calibrated. In the process, the accuracy of the rotating laser is checked separately for every device axis.

Methods for checking and/or calibrating a horizontal axis are known, which are used for all horizontally usable rotating lasers, and methods for checking and/or calibrating a vertical axis are known, which are used exclusively for vertically usable rotating lasers. In a first method, the first horizontal axis is checked and, in a second method, the second horizontal axis is checked, wherein the sequence in which the first and second methods are carried out is arbitrary. In the case of horizontally and vertically usable rotating lasers, following the check of the first and second horizontal axes, a check of the vertical axis takes place in a third method.

The orientation of the device axes in a defined state takes place by means of a leveling instrument, which is disposed in an instrument housing of the rotating laser. The defined state of the device axes can be a horizontal state or a vertical state. The leveling instrument includes a first leveling unit, which orients the first horizontal axis in a first defined state, a second leveling unit, which orients the second horizontal axis in a second defined state, and, in the case of a vertically usable rotating laser, a third leveling unit, which orients the vertical axis in a third defined state. Each of the leveling units includes a tilt sensor, which measures the tilt of the device axis, and an adjusting element, with which the tilt of the device axis can be adjusted. In an ideal case, the tilt sensors are oriented parallel to the allocated device axes. If a tilt sensor is not oriented parallel to the allocated device axis, the device axis has a tilting error.

Bubble levels are normally used as tilt sensors for the horizontal or vertical orientation of equipment such as rotating lasers. A tilt sensor configured as a bubble level includes a housing, which is filled with a liquid and a gas bubble, a light source and one or more photosensors. The housing is sealed by a convexly curved outer layer and the gas bubble moves along the outer layer when the tilt sensor is tilted with respect to a horizontal or vertical reference place. The light source preferably emits divergent light (for example LED) and is centered with one optical axis of the tilt sensor, which simultaneously forms the axis of symmetry of the bubble level. The gas bubble in the sealed liquid indicates the orientation of the bubble level. The gas bubble is always located at the highest point of the liquid. The bubble level is connected to the equipment in such a way that the gas bubble is located at a specific point of the bubble level in a defined state of the equipment. The defined state of the equipment can be produced or restored with minimal effort using the bubble level. The defined state does not necessarily need to be a horizontally or vertically oriented state of the equipment. In principle, any arbitrary tilt angle can also be specified for the defined state by a tilted arrangement of the bubble level on the equipment.

Known rotating lasers, such as the Laser Beacon LB-400 rotating laser, have a temperature sensor, which measures the temperature inside the instrument housing of the rotating laser. If the measured temperature exceeds the upper limit value of the permissible temperature range during operation, operation of the rotating laser is interrupted by shutting down the motors and the beam source. As soon as the measured temperature falls below the upper limit value, operation of the rotating laser can continue. The temperature sensor ensures that the motors and the beam source are operated only within the permissible temperature range and protects the instrument components from being damaged by elevated temperatures. The temperature of the rotating laser is not taken into consideration when calibrating the device axes of the rotating laser.

A rotating laser is known from DE 10 2013 217 479 A1, in which the effect of temperature, the effect of accelerations or forces acting on the rotating laser, and the aging process of the instrument components of the rotating laser are taken in consideration. The rotating laser includes a monitoring unit and a sensor unit with a temperature sensor, an acceleration sensor and a real-time sensor. The temperature sensor measures a storage or operating temperature of the rotating laser, the acceleration sensor measures forces and accelerations that occur from falls or strong impacts and the real-time sensor measures the time duration since the last proper calibration of the rotating laser. The measured values from the sensors are recorded at regular intervals with the aid of the monitoring unit and forwarded to a control and evaluation device. Limit values are defined for every measured variable and the measured values of the sensors are compared to the limit values. If a measured value is outside of the limit value, the monitoring unit generates a warning message for the operator. The warning message is displayed optically or acoustically and includes a request for the operator to calibrate the rotating laser. A limit interval with a lower limit value and an upper limit value is defined for the measured variable of "temperature," wherein the lower limit value corresponds to the minimum temperature and the upper limit value to the maximum temperature of the permissible temperature range. Upper limit values are defined for the measured variables of "acceleration" and "time duration."

DE 10 2013 217 479 A1 does not provide any information about the type of temperature sensor and the spatial arrangement of the temperature sensor in the instrument housing of the rotating laser. In the case of rotating lasers that are used in outside areas, temperature differences can occur within the rotating laser from solar radiation. In the process, temperatures in regions of the rotating laser subject to direct solar radiation can differ by several degrees Celsius from temperatures in shaded regions, and the measured temperature is dependent on the spatial arrangement of the temperature sensor in the instrument housing of the rotating laser.

The objective of the present invention consists of developing a method for measuring an operating temperature of equipment, which can be oriented in a defined state using a leveling instrument, wherein the equipment expenditure for the temperature measurement is reduced. In addition, the temperature is supposed to be able to be measured at different locations in the device housing of the equipment.

According to the invention, the method for measuring an operating temperature of equipment, which can be oriented in a defined state using a leveling instrument, wherein the leveling instrument comprises at least one tilt sensor with a housing that is filled with a liquid and a gas bubble, a light source and a photosensor, comprises the steps:

Storing a characteristic curve of temperatures of the equipment and bubble lengths of the gas bubble in a control device of the equipment, Measuring the bubble length of the gas bubble and Determining the temperature associated with the measured bubble length of the gas bubble with the aid of the characteristic curve.

The advantage of the method according to the invention for measuring an operating temperature of equipment is that the temperature measurement takes place with the aid of a tilt sensor and equipment expenditures for temperature measurement is reduced. Equipment that can be oriented in a defined state normally has a leveling instrument with at least one tilt sensor. The defined state in which the equipment is oriented with the aid of the leveling instrument can be a horizontal state, a vertical state, or a tilted state. The tilt sensor includes a housing, which is filled with a gas bubble and a liquid, a light source, and a photosensor. The gas bubble of the tilt sensor comprises a bubble length. The method according to the invention is based on the fact that the bubble length of the gas bubble changes as a function of the temperature and this dependence is known or is determined. The characteristic curve represents the dependence of the temperature of the bubble length and is stored in the control device of the equipment. If the current operating temperature is supposed to be determined when the equipment is being operated, the bubble length of the gas bubble is measured and the associated temperature is determined based on the characteristic curve. Measuring the operating temperature by means of the tilt sensor is especially advantageous if the operating temperature is used for the orientation of the device axes in a defined state. In this case, the operating temperature is measured precisely at the location in the instrument housing of the equipment, which is relevant for the orientation of the device axis.

The bubble length of the gas bubble is preferably measured by means of the light source and the photosensor of the tilt sensor. If the bubble length is measured with the aid of the light source and the photosensor of the tilt sensor, no further sensor element is required for temperature measurement and equipment expenditures for temperature measurement is low. Temperature measurement by means of the tilt sensor is especially advantageous if the operating temperature is used to orient the device axes in a defined state, because the operating temperature is measured precisely at the location in the instrument housing of the equipment which is relevant for orienting the device axis.

According to the invention, the equipment with at least one device axis, which can be oriented in a defined state, is characterized in that a characteristic curve is provided in the control device, which represents the operating temperature of the equipment as a function of a bubble length of the gas bubble of the tilt sensor. The equipment according to the invention comprises at least one device axis, which can be oriented in a defined state by means of a tilt sensor. The defined state can be a horizontal state, a vertical state, or a tilted state. If the equipment has a plurality of device axes, a tilt sensor is provided for each device axis, which tilt axis is connected to the device axis and measures the orientation of the device axis to the defined state. The equipment according to the invention has a control device, in which a characteristic curve is stored, wherein the characteristic curve represents the dependence of the operating temperature of the equipment on the bubble length of the gas bubble of the tilt sensor. If the current operating temperature is supposed to be determined when the equipment is being operated, the bubble length of the gas bubble is measured and the associated operating temperature is determined based on the characteristic curve.

In a preferred embodiment, the equipment has a first and second device axis, wherein the first device axis can be oriented in a first defined state by means of a first tilt sensor and the second device axis can be oriented in a second defined state by means of a second tilt sensor, and a first and second characteristic curve are provided in the control device, wherein the first characteristic curve represents a first operating temperature of the equipment as a function of a first bubble length of a first gas bubble of the first tilt sensor and the second characteristic curve represents a second operating temperature of the equipment as a function of a second bubble length of a second gas bubble of the second tilt sensor.

The advantage of the equipment according to the invention is that the operating temperature of the equipment can be measured at different locations in the instrument housing thereby increasing the accuracy of temperature measurement. The equipment comprises a first and a second device axis, which can be oriented in a defined state with the aid of a first and second tilt sensor. The first title sensor measures a first temperature and the second tilt sensor measures a second temperature. Temperature measurement by means of the first and second tilt sensors is especially advantageous if the operating temperature is used for the orientation of the device axes in a defined state, because the operating temperature is measured precisely at the location in the instrument housing of the equipment that is relevant for the orientation of the device axis. The first tilt sensor measures the first temperature and the first tilt angle of the first device axis, and the second tilt sensor measures the second temperature and the second tilt angle of the second device axis.

The equipment especially preferably has a third device axis, wherein the third device axis can be oriented in a third defined state by means of a third tilt sensor, and a third characteristic curve is provided in the control device, wherein the third characteristic curve represents a third operating temperature of the equipment as a function of a third bubble length of a third gas bubble of the third tilt sensor. The equipment comprises a third device axis, which can be oriented in a defined state by means of a third tilt sensor, wherein the third tilt sensor measures a third temperature. Every tilt sensor of the equipment is suitable for temperature measurement and can increase the accuracy of temperature measurement. The advantage of the equipment according to the invention is that a separate characteristic curve is stored in the control device for each device axis of the equipment, which characteristic curve represents the dependence of the operating temperature on the bubble length of the gas bubble.

Exemplary embodiments of the invention are described in the following based on the drawings. These drawings are not necessarily supposed to represent the exemplary embodiments to scale, rather the drawings are executed in a schematic and/or slightly distorted form when this is useful for explanatory purposes. It must be taken into consideration in this case that a wide range of modifications and changes related to the form and detail of an embodiment may be undertaken without deviating from the general idea of the invention. The general idea of the invention is not restricted to the exact form or detail of the preferred embodiment described and depicted in the following or restricted to a subject matter which would be limited as compared to the subject matter claimed in the claims. In the case of any dimensioning ranges given, values within the stated limits are also meant to be disclosed as limit values, and be applicable at will and claimable. For the sake of simplicity, the same reference numbers are used in the following for identical or similar parts or parts having an identical or similar function.

DETAILED DESCRIPTION OF THE DRAWINGS

Figure 1:
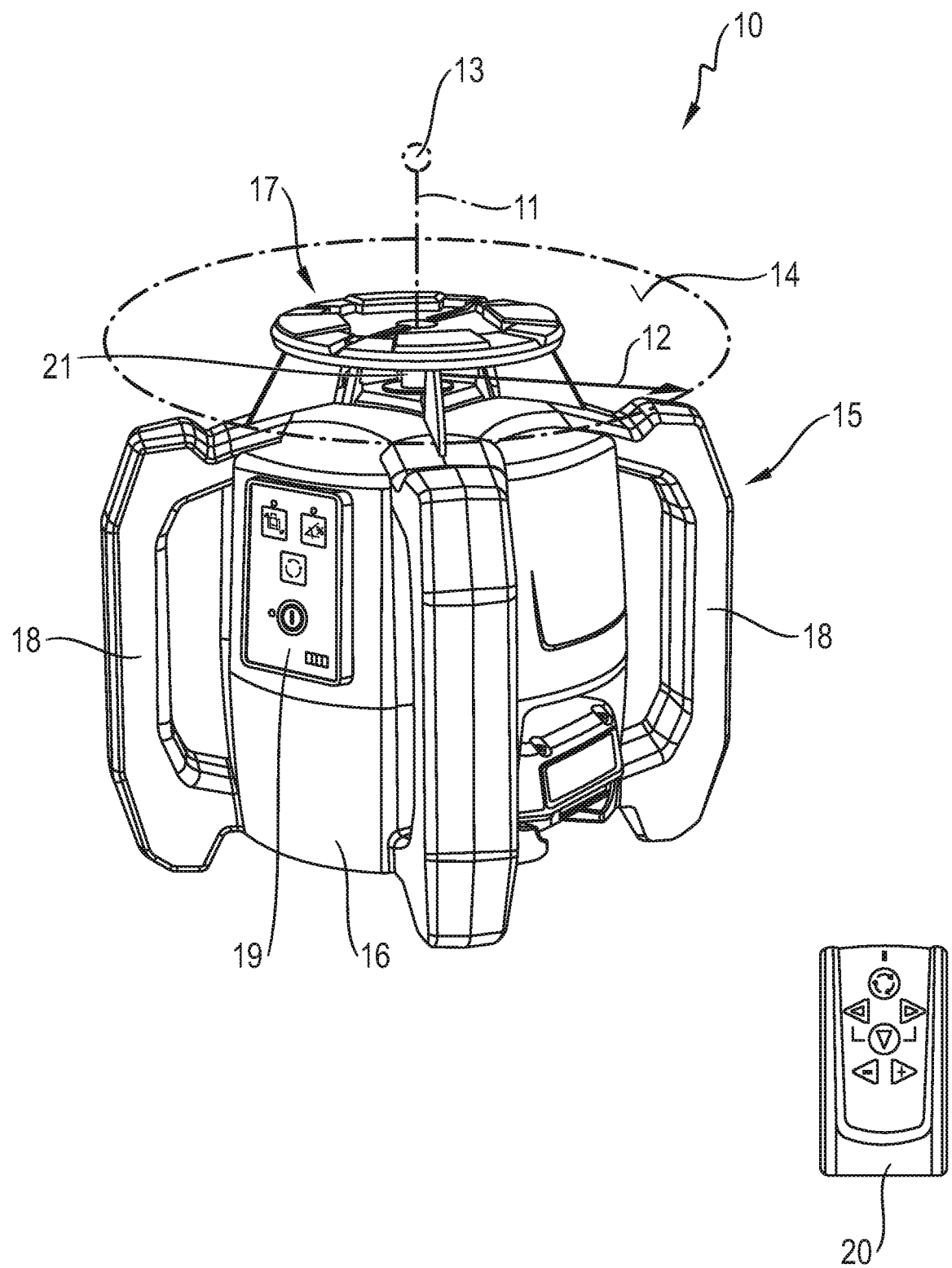
FIG. 1 illustrates an equipment according to the invention, which is configured as a rotating laser that can be oriented horizontally and vertically with three device axes, wherein the device axes include a first horizontal axis, a second horizontal axis and a vertical axis.

FIG. 1 shows a piece of equipment 10 according to the invention, which is configured as a rotating laser that can be oriented horizontally and vertically. The rotating laser 10 generates a first laser beam 12 rotating around an axis of rotation 11 and a quiescent second laser beam 13. The rotating first laser beam 12 generates a laser plane 14, which is disposed perpendicular to the axis of rotation 11, and the second laser beam 13 runs perpendicular to the laser plane 14 of the first laser beam 12.

The rotating laser 10 includes an instrument housing 15 and measuring device disposed in the instrument housing 15. The instrument housing 15 consists of a basic housing 16, a rotation head 17 and a plurality of handgrips 18. Operation of the rotating laser 10 is carried out via an operating device 19, which is integrated into the basic housing 16 and can be operated from the outside. In addition to the operating device 19 integrated into the basic housing 16, a remote control 20 can be provided, which can be connected to the rotating laser 10 via a communication connection.

The measuring device of the rotating laser 10 generates a laser beam inside the basic housing 15, which laser beam strikes the deflection optics 21 rotating around the axis of rotation 11. A first portion of the laser beam is deflected 90° by the deflection optics 21 and forms the first laser beam 12 of the rotating laser 10. A second portion of the laser beam passes through the deflection optics 21 and forms the second laser beam 13 of the rotating laser 10. Depending on the rotational speed with which the first laser beam 12 rotates around the axis of rotation 11, a differentiation is made between a rotation mode, a line mode and a point mode of the rotating laser 10.

Figure 2A:
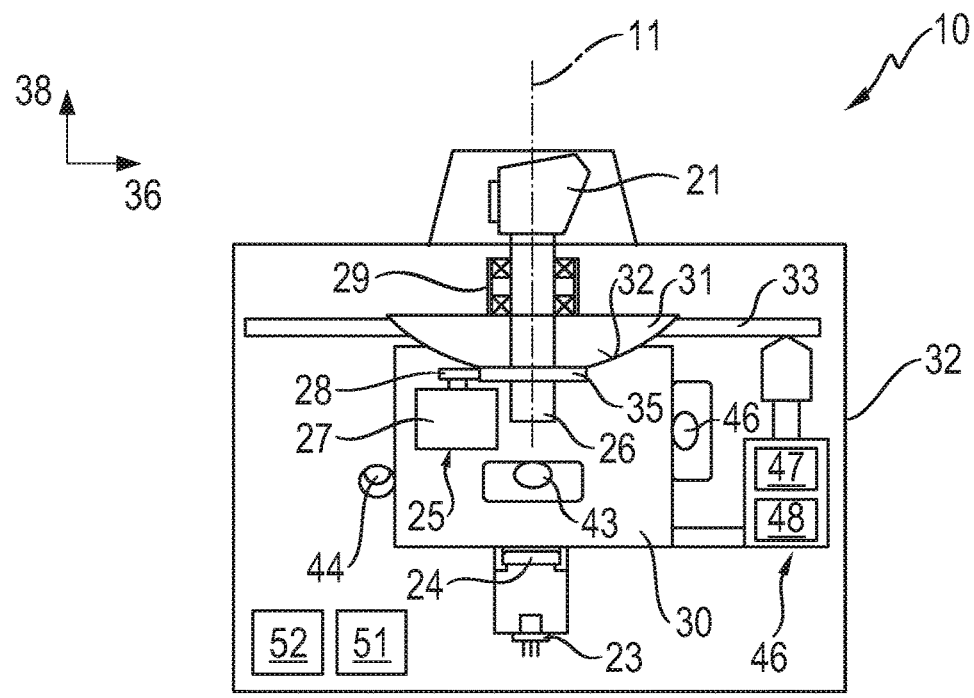
FIGS. 2A, B illustrate the essential components of the rotating laser of FIG. 1, which include a leveling instrument with a first leveling unit for orienting the first horizontal axis, a second leveling unit for orienting the second horizontal axis and a third leveling unit for orienting the vertical axis.
Figure 2B:
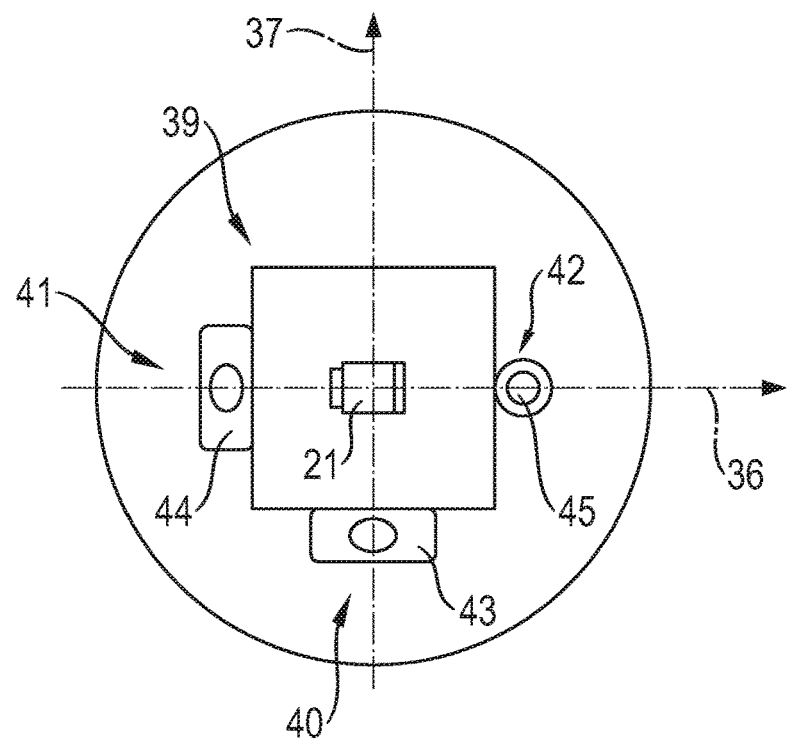

FIGS. 2A, B shows a schematic representation of the essential components of the rotating laser 10 of FIG. 1, wherein FIG. 2A shows the components in a vertical plane parallel to the axis of rotation 11 and FIG. 2B shows the components in a horizontal plane perpendicular to the axis of rotation 11.

The rotating laser 10 includes a laser device with a beam source 23, which generates a laser beam, and collimation optics 24. The beam source 23 is configured for example as a semiconductor laser, which generates the laser beam in the visible wavelength spectrum, for example a red laser beam with a wavelength of 635 nm or a green laser beam with a wavelength of 532 nm. After the laser beam exits from the beam source 23, the laser beam is collimated with the aid of the collimation optics 24. Alternatively, the collimation optics can be integrated into the beam source, or the collimation optics can be dispensed with in the case of a beam source 23 with a high beam quality and low divergence.

The collimated laser beam strikes the deflection optics 21, which separate the first and second laser beams 12, 13. The deflection optics 21 are connected to a rotating device 25, which move the deflection optics 21 around the axis of rotation 11. The rotating device 25 includes a rotatable shaft 26, a motor unit 27 and a transmission device 28, which is configured for example in the form of a toothed belt and transmits the movement of the motor unit 27 to the shaft 26.

The deflection optics 21 are coupled to the rotatable shaft 26 and are configured to be rotatable around the axis of rotation 11. The shaft 26 is mounted in a pivot bearing 29 of a stator element 30, which is connected to a spherical calotte 31. The spherical calotte 31 is mounted in a spherical calotte bearing 32 in a housing-mounted assembly frame 33 so it can tilt around two swivel planes that are perpendicular to the rotational plane (plane perpendicular to the axis of rotation 11). The rotating laser 10 includes a measuring device 35, which measures the angle of rotation of the shaft 26 during the rotation around the axis of rotation 11. The measuring device 35 is configured for example as an angular encoder and consists of a measuring disk, which is connected to the shaft 26 for rotation therewith, a scanning element, with which the measuring disk is scanned, and an evaluation and control element.

The rotating laser 10 is configured as a horizontally and vertically usable rotating laser, wherein a horizontally and vertically usable rotating laser differs from a horizontally usable rotating laser by an additional device axis. The rotating laser 10 has, as device axes, a first horizontal axis 36 and a second horizontal axis 37, which run perpendicularly to each other and span a device plane. The first and second horizontal axes 36, 37 are displayed on the rotation head 17 of the rotating laser 10 via display elements. In addition to the first and second horizontal axes 36, 37, the horizontal and vertically usable rotating laser 10 comprises a further device axis, which is designated as a vertical axis 38 and, in an ideal case, is oriented perpendicularly to the device plane of the first and second horizontal axes 36, 37.

The rotating laser 10 is configured as a self-leveling rotating laser, which automatically levels when the instrument housing 15 of the rotating laser 10 is set up within a self-leveling range. The self-leveling range of rotating lasers typically lies at 5°. The rotating laser 10 includes a leveling instrument, which orients the device axes of the rotating laser 10 in a defined state independent of an orientation of the instrument housing 15. The leveling instrument includes a first leveling unit 40, which orients the first horizontal axis 36 in a first defined state, a second leveling unit 41, which orients the second horizontal axis 37 in a second defined state, and a third leveling unit 42, which orients the vertical axis 38 in a third defined state.

The first leveling unit 40 includes a first tilt sensor 43 and a first adjusting element, the second leveling unit 41 includes a second tilt sensor 44 and a second adjusting element, and the third leveling unit 42 includes a third tilt sensor 45 and a third adjusting element. The adjusting elements of the leveling units 40, 41, 42 are integrated into a tilt system 46, which comprises a first adjusting motor 47 and a second adjusting motor 48. The first adjusting motor 47 tilts the assembly frame 33 around a first swivel axis, which coincides with the second horizontal axis 37, and the second adjusting motor 48 tilts the assembly frame 33 around a second first swivel axis, which coincides with the first horizontal axis 36. The first adjusting motor 47 forms the first adjusting element of the first leveling unit 40 and the second adjusting motor 48 forms the second adjusting element of the second leveling unit 41. Because the vertical axis 38 is oriented perpendicular to the horizontal plane of the first and second horizontal axes 36, 37, the orientation of the vertical axis 38 can be adjusted by means of the first and second adjusting motors 47, 48. The first and second adjusting motor 47, 48 together form the third adjusting element of the third leveling unit 42.

The horizontal orientation of the laser plane or of the device plane constitutes a preferred defined state, in which a rotating laser 10 is supposed to be oriented in the horizontal position, wherein the horizontally oriented device plane is also designated as the horizontal plane. The vertical orientation of the laser plane or of the device plane constitutes a preferred defined state, in which a rotating laser 10 is supposed to be oriented in the vertical position, wherein the vertically oriented device plane is also designated the vertical plane. The laser plane, which generates the rotating first laser beam 12, can be tilted by means of the tilt system 46 with respect to the horizontal plane or the vertical plane of the rotating laser 10. The rotating laser 10 can tilt the laser plane of the rotating first laser beam 12 in one tilt direction or in two tilt directions. The tilt of the laser plane takes place in a levelled state of the rotating laser 10. The rotating laser 10 can be tilted in a horizontal position or in a vertical position.

Control and evaluation of the rotating laser 10 is carried out via control elements, which are connected to the beam source 23, the rotating device 25, the measuring device 35, the leveling instrument 40, 41, 42 and the tilt system 46. The control elements are integrated into a common control device 51, which is configured as a microcontroller for example, or can be configured as separate components.

Because the orientation of the tilt sensors 43, 44, 45, which orient the device axes 36, 37, 38 of the rotating laser 10 in a defined state, is temperature-dependent and the rotating laser 11 can be used in a large temperature range, for example between −20° C. and +50° C., it is advantageous if a plurality of zero positions D are stored in the control device 51 of the rotating laser 10.

Figure 3:
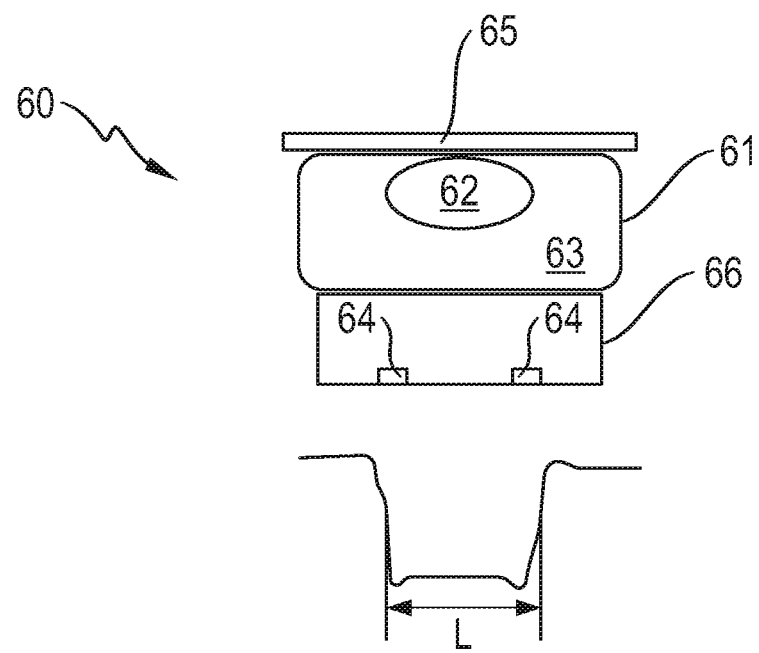
FIG. 3 illustrates the structure of a tilt sensor for the leveling units of the rotating laser with a housing, which is filled with a liquid and a gas bubble, a light source and a photosensor.

FIG. 3 shows the structure of an optical tilt sensor 60, which corresponds in terms of structure to the tilt sensors 43, 44, 45 for the leveling units 40, 41, 42 of the rotating laser 10. The tilt sensor 60 includes a housing 61, which is filled with a gas bubble 62 and a liquid 63, a light source 64, a photosensor 65 and a spacer 66.

The rotating laser 10 comprises three device axes, which are configured as the first horizontal axis 36, second horizontal axis 37 and vertical axis 38. The leveling instrument 39 of the rotating laser 10 includes, for every device axis 37, 38, 39, a leveling unit 40, 41, 42 with a tilt sensor 43, 44, 45 and an adjusting element. The tilt sensors 43, 44, 45 operate independent of each other and can have different temperatures during operation of the rotating laser 10. The temperature of the rotating laser 10 can be measured by means of the tilt sensors 43, 44, 45. The temperature of the first tilt sensor 43 is designated as the first temperature $T_1$, the temperature of the second tilt sensor 44 as the second temperature $T_2$ and the temperature of the third tilt sensor 45 as the third temperature $T_3$.

The gas bubble 62 of the tilt sensor 60 comprises a bubble length L, which is temperature-dependent and is therefore suitable as a measured variable for the temperature T of the tilt sensor 60. The bubble length L of the gas bubble 62 can be measured with the aid of the light source 64 and the photosensor 65. To differentiate between the first, second and third tilt sensors 43, 44, 45, the components of the tilt sensors are provided with an index, which is separated from the reference sign by a hyphen. The first tilt sensor 43 has the index "1", the second tilt sensor 44 the index "2" and the third tilt sensor 45 the index "3". The first temperature $T_1$ of the first tilt sensor 43 is determined by a first bubble length $L_1$ of the first gas bubble 62-1, the second temperature $T_2$ of the second tilt sensor 44 is determined by a second bubble length $L_2$ of the second gas bubble 62-2 and the third temperature $T_3$ of the third tilt sensor 45 is determined by a third bubble length $L_3$ of the third gas bubble 62-3.

The advantage of temperature measurement by means of the tilt sensors 43, 44, 45 as opposed to a temperature measurement by means of a temperature sensor in the instrument housing of the rotating laser 10 is that the temperature $T_1$, $T_2$, $T_3$ is measured precisely at the location in the instrument housing 15 which is relevant for the orientation of the first horizontal axis 36, the second horizontal axis 37 and the vertical axis 38. The first tilt sensor 43 measures the first temperature $T_1$ and the first tilt angle of the first horizontal axis 36, the second tilt sensor 44 measures the second temperature $T_2$ and the second tilt angle of the second horizontal axis 37, and the third tilt sensor 47 measures the third temperature $T_3$ and the third tilt angle of the vertical axis 38.

Figure 4:
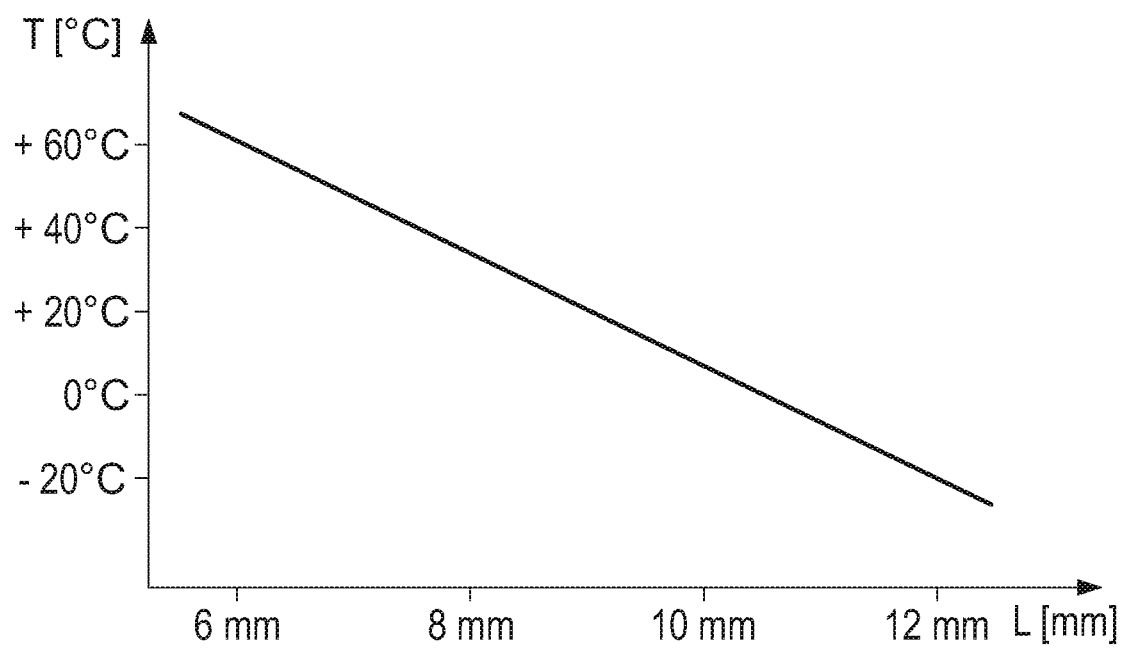
FIG. 4 is a characteristic curve of temperatures and bubble lengths of the gas bubble of the tilt sensor from FIG. 3.

FIG. 4 shows a characteristic curve, which represents the temperature T as a function of the bubble length L of the gas bubble 62. The characteristic curve establishes a correlation between the temperature T of the tilt sensor 60 and the bubble length L of the gas bubble 62 for the permissible temperature range of the rotating laser 10 of −20° C. to +50° C. The bubble length L of the gas bubble 62 changes linearly with the temperature T of the tilt sensor 60, wherein the bubble length L decreases with a dropping temperature T.

Accuracy during temperature measurement can be increased if a separate characteristic curve representing the temperature of the tilt sensor as a function of the bubble length of the gas bubble is determined for every tilt sensor 43, 44, 45 of the leveling instrument 39. The control device 51 of the rotating laser 10 comprises a first characteristic curve representing the first temperature $T_1$ of the first tilt sensor 43 as a function of the first bubble length $L_1$ of the first gas bubble 62-1, a second characteristic curve representing the second temperature $T_2$ of the second tilt sensor 44 as a function of the second bubble length $L_2$ of the second gas bubble 62-2, and a third characteristic curve representing the third temperature $T_3$ of the third tilt sensor 45 as a function of the third bubble length $L_3$ of the third gas bubble 62-3.

The invention claimed is:

1. A method for measuring an operating temperature of equipment (10) which is orientable in a defined state using a levelling instrument (39), wherein the levelling instrument (39) comprises a tilt sensor (43, 44, 45; 60) with a housing (61) that is filled with a gas bubble (62) and a liquid (63), a light source (64), and a photosensor (65), comprising the steps of:

storing a characteristic curve of temperatures (T) of the equipment and bubble lengths (L) of the gas bubble (62) in a control device (51) of the equipment (10);

measuring a bubble length (L) of the gas bubble (62) by the tilt sensor, wherein the bubble length (L) of the gas bubble (62) is measured by the light source (64) and the photosensor (65) of the tilt sensor (60); and determining a temperature (T) associated with the measured bubble length (L) of the gas bubble (62) based on the characteristic curve.

2. An equipment (10) with a device axis (36, 37, 38) which is orientable in a defined state, comprising:

a control device (51); and a tilt sensor (43, 44, 45; 60) including a housing (61) that is filled with a gas bubble (62) and a liquid (63), a light source (64), and a photosensor (65), wherein the tilt sensor (43, 44, 45) is connected to the device axis (36, 37, 38) and measures an orientation of the device axis (36, 37, 38) to the defined state by the light source (64) and the photosensor (65);

wherein a characteristic curve is provided in the control device (51) and wherein the characteristic curve represents an operating temperature (T) of the equipment (10) as a function of a bubble length (L) of the gas bubble (62) of the tilt sensor (60).

3. The equipment according to claim 2, wherein the equipment (10) has a first device axis (36) and a second device axis (37), wherein the first device axis (36) is orientable in a first defined state by a first tilt sensor (43) and the second device axis (37) is orientable in a second defined state by a second tilt sensor (44), wherein a first and a second characteristic curve are provided in the control device (51), wherein the first characteristic curve represents a first operating temperature (T1) of the equipment (10) as a function of a first bubble length (L1) of a first gas bubble (62-1) of the first tilt sensor (43) and the second characteristic curve represents a second operating temperature (T2) of the equipment (10) as a function of a second bubble length (L2) of a second gas bubble (62-2) of the second tilt sensor (44).

4. The equipment according to claim 3, wherein the equipment (10) has a third device axis (38), wherein the third device axis (38) is orientable in a third defined state by a third tilt sensor (45), wherein a third characteristic curve is provided in the control device (51), and wherein the third characteristic curve represents a third operating temperature (T3) of the equipment (10) as a function of a third bubble length (L3) of a third gas bubble (62-3) of the third tilt sensor (45).

* * * * *